United States Patent [19]

Rowsey, Jr.

[11] 4,271,604

[45] Jun. 9, 1981

[54] PORTABLE PLANETARIUM

[76] Inventor: Luther B. Rowsey, Jr., P.O. Box 666, Friendswood, Tex. 77546

[21] Appl. No.: 48,822

[22] Filed: Jun. 19, 1979

[51] Int. Cl.³ .................................................. G09B 27/00
[52] U.S. Cl. .................................... 434/289; 434/285; 434/287; 135/33 R
[58] Field of Search ........................... 35/42.5, 43, 45

[56] References Cited

U.S. PATENT DOCUMENTS

| 336,280 | 2/1886 | Bailey | 35/45 |
| 1,150,731 | 8/1915 | Barcus | 35/43 X |
| 2,372,487 | 3/1945 | Hagner | 35/43 |
| 2,477,027 | 7/1949 | Wenberg | 35/42.5 |

FOREIGN PATENT DOCUMENTS

342886  2/1931  United Kingdom ........................ 35/43

OTHER PUBLICATIONS

How to Set Up and Use Astrobella, by C. M. Sharp et al., 1977, 117 East Lane, West Horsley, Leatherhead, Surrey KT246LJ, Gt. Britain.
The Stars, by H. A. Rey, p. 22.
Science News, vol. 111, p. 350 "June Stars".

*Primary Examiner*—Arthur D. Kellogg
*Attorney, Agent, or Firm*—Arnold, White & Durkee

[57] ABSTRACT

A portable planetarium is disclosed for ascertaining the position of the sun, the planets and their satellites and the stars throughout the year. The planetarium includes a frame having a configuration defined by a frustrum of a cone with a substantially hemispherical cap attached thereon. A pole is aligned with the center axis of the frustrum of the cone and extends through the top of the hemispherical cap, with the intersection of the pole and the top of the hemispherical cap utilized as a reference point denoting the north star or Polaris. A covering is secured to the frame and a plurality of markings are selectively applied to the covering using Polaris as the reference point. A plurality of adhesive symbols may also be included to form an educational kit to teach the location of stars and the path of the sun and the planets during the course of the year.

11 Claims, 5 Drawing Figures

PORTABLE PLANETARIUM

BACKGROUND OF THE INVENTION

This invention relates to planetariums and, in particular, to a portable planetarium having the shape, structure, and utility of an extended umbrella while serving the dual and more important function of being an educational tool usable to ascertain the location of planets and stars throughout the year.

Devices utilizing umbrella shaped domes to designate a portion of the sky and the stars contained therein were first proposed many years ago. U.S. Pat. No. 1,150,731 to Barcus discloses a star finder in the shape of a parasol on which stars and certain constellations are marked to be used as a guide in finding their location in the sky. The structure of Barcus' umbrella, however, limits his device to being able to depict accurately only a very small portion of the sky in that the common parasol which Barcus utilizes emcompasses less than a full hemisphere.

This design proves disadvantageous in that the ecliptic, the path along which the sun travels in the sky in relation to the stars, may not be accurately shown upon a hemisphere using Polaris as a polar reference. Since the ecliptic may not be accurately depicted upon a parasol such as utilized in Barcus, it is impossible for such a device to accurately depict the position of the planets throughout the course of the year, for the planets travel with the sun through the sky. British Pat. No. 342,886 to Grone discloses a similar device for teaching astronomy. Grone's device also includes less than 90°, or less than a full hemisphere, and therefore Grone again could not accurately depict the full ecliptic without distortion. Grone fails to disclose, thereby, a portable planetarium, but rather proposes a partial star map to be utilized in certain locations in depicting only certain constellations. Both Grone and Barcus suffer the common disadvantage of being unable to accurately depict the full ecliptic thereby precluding their use to trace the path of the planets during the course of the entire year.

It should also be understood that since the devices disclosed in Barcus and Grone utilize an ordinary parasol or umbrella, they must be viewed from outside of the umbrella. Therefore, while they provide some added dimension, their effect is not unlike that of viewing a portion of the sky depicted on a flat star map.

SUMMARY OF THE INVENTION

The present invention overcomes the prior art disadvantages through a portable planetarium which extends from plus 90° to minus 60°, thereby accommodating depiction of the complete ecliptic and the twelve zodiac constellations located along it.

According to the invention, the portable planetarium for ascertaining the position of the sun, the moon, the planets and their satellites and the stars throughout the year includes a frame having a configuration defined by a frustum of a cone with a substantially hemispherical cap attached thereon. A pole is included which is aligned with the center or polar axis of the frustum of the cone and extends through the top of the hemispherical cap. A covering is secured to the frame and a plurality of markings are selectively applied to the covering using the intersection of the pole and the top of the hemispherical cap of the frame as a point of reference representing Polaris, such that the location of the markings corresponds to the location of the twelve primary zodiac constellations along the ecliptic.

In a more detailed aspect of the present invention, the planetarium may further include a plurality of symbols for applying to the covering in order to denote the location of the sun and the planets and their satellites at arbitrary times throughout the year.

In the preferred embodiment, the frame is collapsible and includes ribs running longitudinally from the base of the cone to the top of the hemispherical cap, with the ribs substantially converging at the point of intersection between the pole and the top of the hemispherical cap.

In one aspect of the preferred embodiment, the covering may include an inner surface an an outer surface, with the markings being applied to the inner surface of the covering.

In a more preferred embodiment, the covering comprises substantially transparent film having the markings as described above in order to accommodate use of the planetarium to correlate the markings on the covering with the actual celestial bodies. The markings may further be phosphorescent so as to make them glow in the dark for use at night or within a dark room for such correlation.

Hence, the present invention provides an improved planetarium in that the frustum of the cones extends the normal hemispherical shape of many conventional umbrellas so that the dome extends to accommodate the accurate portrayal of the entire ecliptic. Accordingly, the user may then put his head up into the dome and, by properly orientating the slant of the dome as described below, the sky he sees around him as marked on the dome will substantially correspond to the sky he would see around him at that same location at night. The present invention therefore enables one to make a direct correlation between a position of a star inside the umbrella to the position of that star in the sky, regardless of his location in the Northern Hemisphere or the time of year.

BRIEF DESCRIPTION OF THE DRAWINGS

This invention will be more fully understood from the following detailed description thereof, taken in connection with the accompanying drawings, which form a part of this application, and in which.

DESCRIPTION OF THE PREFERRED EMBODIMENT

Figure 1:
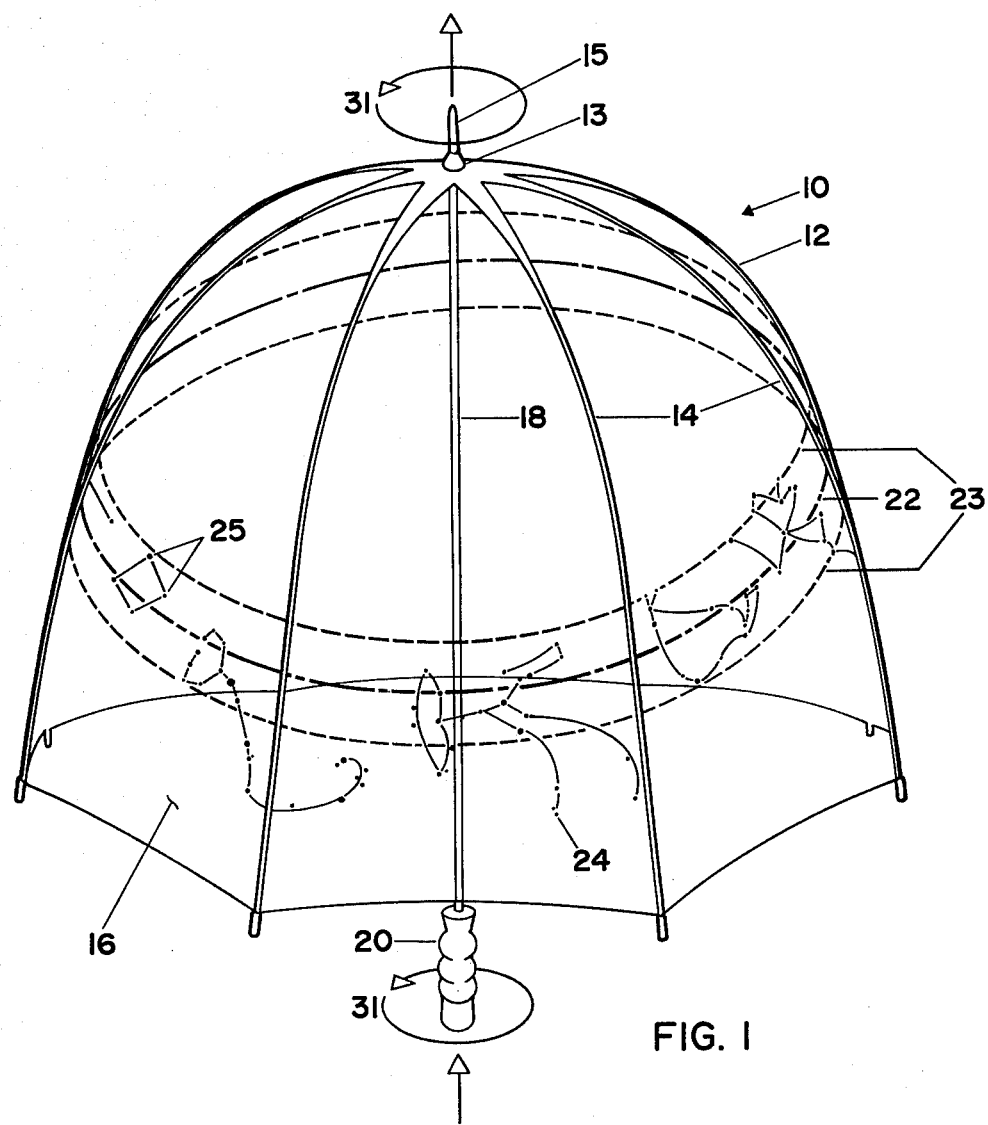
FIG. 1 is a perspective view of a portable planetarium illustrating the ecliptic together with the southern most zodiac constellations falling along the ecliptic.

Referring to FIG. 1, there is depicted a portable planetarium 10 comprising a frame 12, a covering 16 secured to the frame 12, the ecliptic 22 shown with long and short dashes on the covering 16, and a pole 18 extended along the outer axis of the frame and having a handle 20.

The frame 12 has a configuration substantially defined as the frustum of a cone having a substantially hemispherical cap attached thereon. In the preferred embodiment, the frustum of the cone extends the dome from plus 90° at the top of the hemispherical cap to minus 60° at the base of the cone, thereby accommodating the inclusion of certain southern constellations and stars such as Alpha Centauri, as well as the ecliptic. It should be understood by those of skill in the art, however, that the cone may extend the hemispherical cap to a value of less than minus 60° and still include the entire ecliptic and the constellations arranged along the ecliptic.

In the preferred embodiment, frame 12 comprises a modified bubble umbrella having ribs 14 which extend longitudinally, radiating outwardly from a central point 13 at the top of the hemispherical cap. Means for collapsing the frame 12 is provided by a plurality of braces 17 pivotally secured to a slide 19 (shown in FIG. 2) and to the ribs 14 such that the frame opens and closes in a manner similar to conventional umbrellas.

Covering 16 is tautly secured to frame 12 by suitable means and may comprise a substantially transparent film in order to allow one to use the umbrella outdoors to make a direct correlation between the location of the stars in the sky and the stars on the portable planetarium. It should be understood, however, that other suitable coverings could be utilized in accordance with the present invention.

Passing through frame 12 such that it substantially aligns with the frame's center axis is a pole 18. The pole 18 is secured to the frame 12 at the top of the hemispherical cap at the central point 13. The pole may extend a short distance above the frame thereby forming an indicator 15. The pole may further include a handle 20 connected to the bottom of the pole 18, thereby forming a suitable grip for holding the portable planetarium.

In the preferred embodiment, the pole 18 comprises a cylindrical metal rod and the handle 20 comprises a formed plastic grip connected at the end of the pole 18. It should be understood that the length of pole 18 is not critical so long as it is of sufficient length to facilitate handling of the portable planetarium. In fact, since the person using the portable planetarium should be place his head well within the planetarium, a very short pole 18 and handle 20 may be utilized to insure that the planetarium is properly used.

Figure 3:
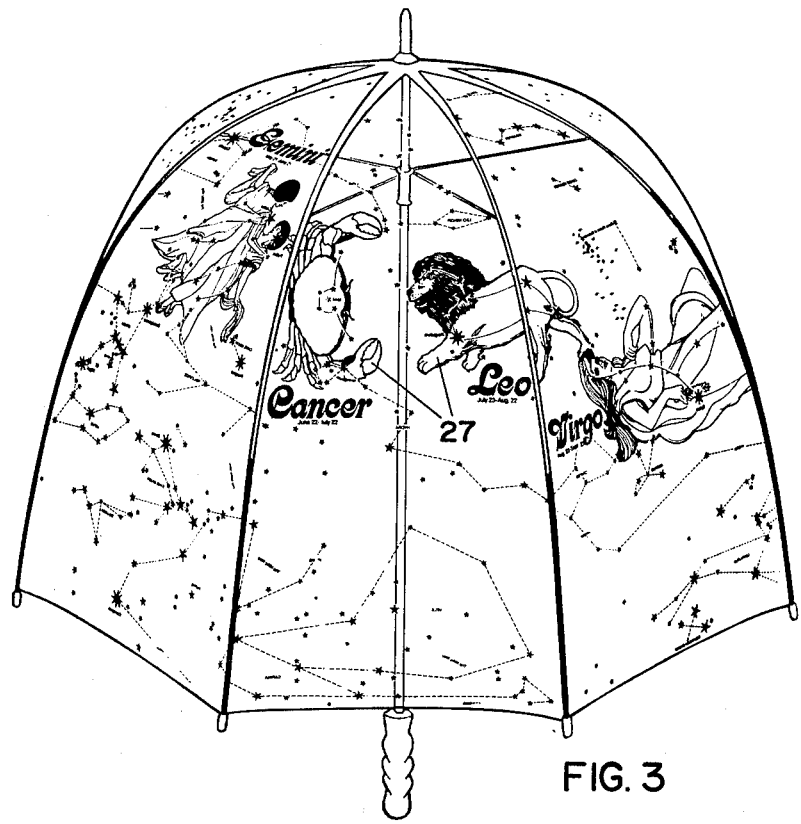
FIG. 3 is a perspective view of the portable planetarium in accordance with the present invention illustrating four of the more northernly constellations of the zodiac along the ecliptic as represented by the astrological FIGS. depicted thereon.
Figure 4:
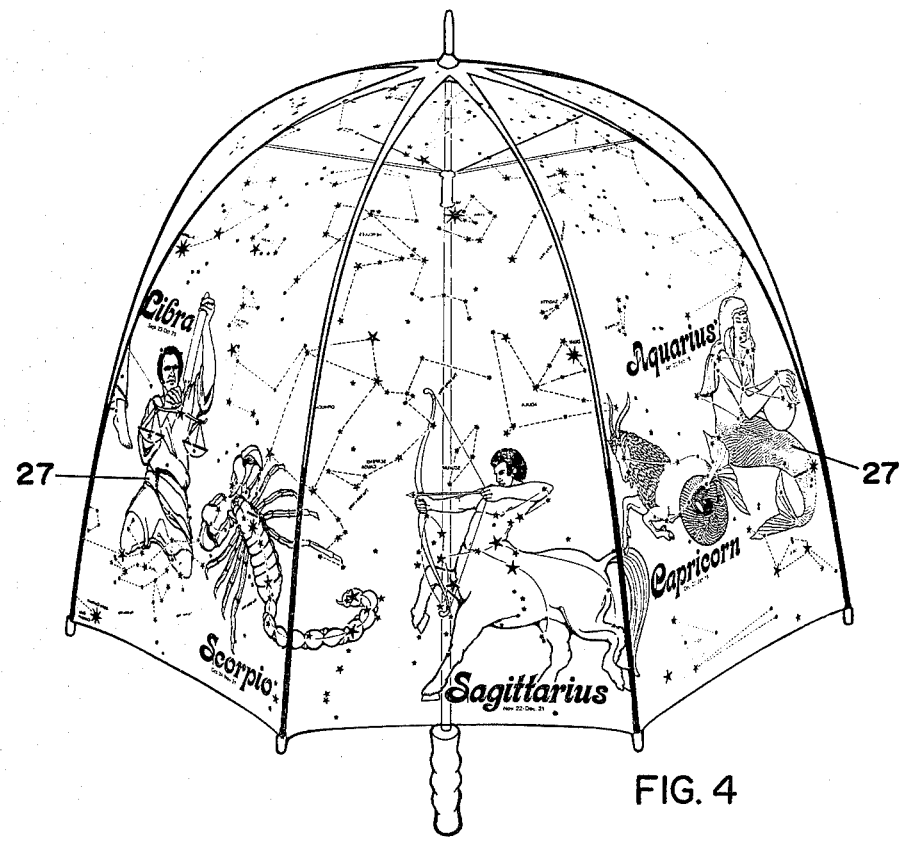
FIG. 4 is a perspective view of the planetarium illustrating the constellations shown in FIG. 2, but with the addition of astrological figures to denote the constellations of the zodiac contained thereon.
Figure 5:
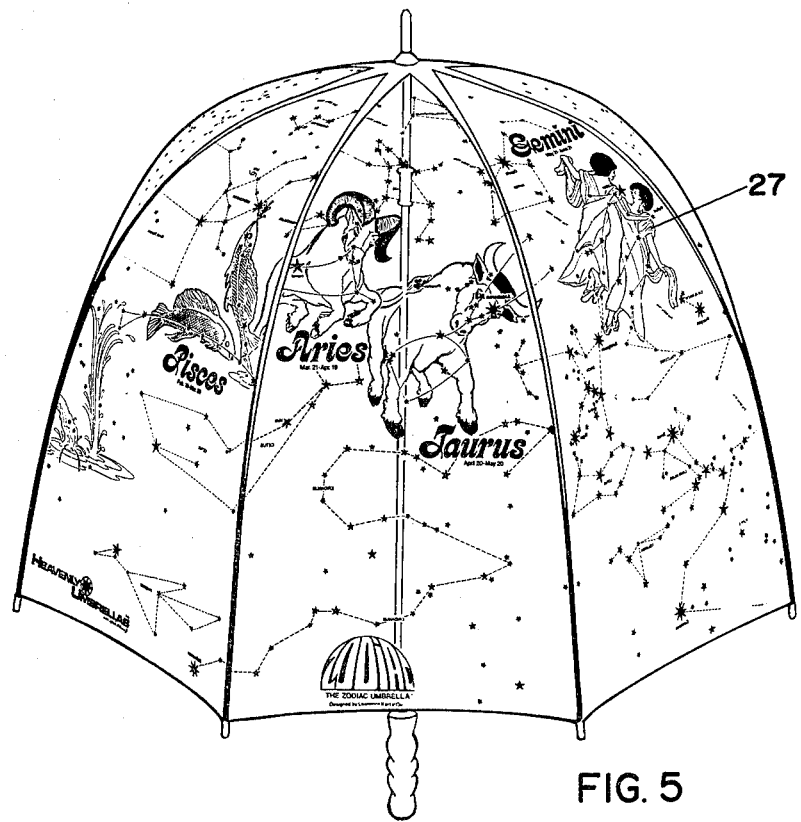
FIG. 5 is a perspective view illustrating the remaining constellations of the zodiac along the ecliptic, as denoted by a plurality of astrologicalfigures.

Referring to FIG. 1, a plurality of markings 25 are positioned upon the umbrella to correspond with the stars in the sky using the central point 13 as the position of Polaris, thereby giving a point of reference which determines the relative positions of all of the other stars. Using Polaris as the point of reference, the ecliptic 22 may then be seen to extend, as shown in FIG. 1, substantially southward to encompass the constellation Sagittarius, as denoted by its southernmost star 24, and northward on the opposing side to Gemini (not shown). The belt of the zodiac 23, represented by the evenly dashed lines, defines, in turn, the area of space in which the moon and planets appear to travel. In the preferred embodiment, neither the line of the ecliptic, nor the belt of the zodiac are actually designated on the covering 16. Rather, as shown in FIGS. 3-5, the zodiac constellations are highlighted, thereby indicating the general path of the ecliptic and the belt of the zodiac.

Figure 2:
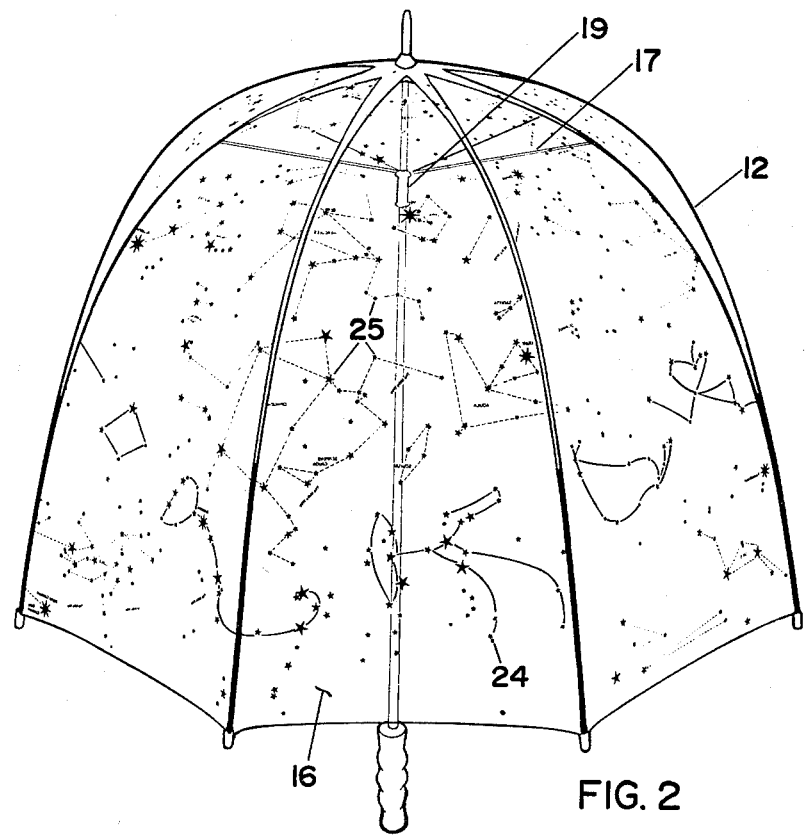
FIG. 2 is a side view of the portable planetarium of FIG. 1 illustrating the same constellations together with a plurality of other constellations as included in the preferred embodiment of the present invention.

A plurality of markings may also be positioned as shown in FIG. 2, over substantially the entire covering 16 to denote the brighter and better known stars in the sky. Further, referring to FIGS. 3 through 5, astrological FIGS. 27 are shown as included in the preferred embodiment to highlight the twelve zodiac constellations, thereby highlighting the path of the ecliptic in the sky. It should be understood that the forms of the astrological figures are arbitrary and that they are utilized merely to show the location of the zodiac constellations and to provide a correlation with the astronomical constellations which form the basis for the study known as astrology which is so popular today. The astrological figures, in turn, emphasize the necessity of the addition of the frustum of the cones to the hemispherical cap to insure that the southernmost constellations along the ecliptic may be included upon the planetarium. That is, absent the additional length provided by the frustum of the cone, the southern sweep of the ecliptic as represented by Libra, Scorpio, Sagittarius Capricorn, and Aquarius could not be accurately depicted.

Accordingly, when the apparatus in the preferred embodiment is utilized, the latitude at which the planetarium is to be used is first determined. This latitude indicates the angle at which the planetarium should be tilted to be representative of the stars overhead at that portion of the earth. The pole 18 should be tilted, then, so that the indicator 15 is pointing at the north star and so that the pole 18 forms an angle off the vertical corresponding to the degrees latitude on the earth at which the user is located. The planetarium is next rotated until the correct zodiac constellation is overhead (January—Taurus, Februay—Gemini, March—Cancer, April—Leo, May—Virgo, June—Libra, July—Scorpio, August—Sagittarius, September—Capricorn, October—Aquarius, November—Pices, and December—Aries). Placing one's head well within the planetarium, then, the sky seen overhead and to the right and left in the planetarium corresponds to the sky observed outside at approximately 10:00 p.m. at that time of the year. By turning the umbrella shaft counterclockwise (arrow 31) at the rate of 45° every three hours, while facing north, the westward motion of the star field during the night will be portrayed.

Hence, the embodiment of the present invention provides a means for correlating a marked planetarium with the sky as it is actually seen overhead, with markings on the planetarium overhead and to the right and left substantially corresponding to the stars overhead and to the right and left when looking at the sky.

As an alternative embodiment of the present invention, adhesive symbols may be included to form an educational kit wherein the symbols may be selectively applied and removed to track the path of the sun, the moon, and the planets through the ecliptic. Additionally, adhesive symbols may be included in order to enable the addition of certain stars as their positions is learned. These adhesives may take a variety of colors and shapes to denote degrees of brightness or to differentiate between the planets and stars. They may further be phosphorescent or some other form of luminescence in order that they may be used in the dark or with special light.

The instant invention has been disclosed in connection with specific embodiments. However, it will be apparent to those skilled in the art that variations for illustrated embodiment may be undertaken without departing from the spirit and scope of the invention. For example, a rigid or collapsable frame made of plastic or other suitable material may be utilized instead of the collapsable ribbed frame utilized in the preferred embodiment. Additionally, the bottom of the frame could be curved slightly inwardly without changing the effect of the planetarium so long as a person could still place his head well within the planetarium. A further variation would include making the southern hemispherical polar reference align with the top of the hemispherical cap to thereby utilize the planetarium in the southern hemisphere. An additional variation would include printing the stars on the umbrella with a phosphorescent material. These and other variations will be apparent to those skilled in the art and are within the spirit and scope of the invention.

What is claimed is:

1. A portable planetarium for ascertaining the position of the sun, the moon, the planets and their satellites, and the stars throughout the year, comprising:
   a frame having a configuration defined by a frustum of a cone with a substantially hemispherical cap attached thereon in order to accurately depict the full ecliptic path, the frustum of the cone and the hemispherical cap having inner dimensions such that a human using the planetarium may place his head within them in order to substantially simulate the perspective of the sky around the human;
   a pole secured to the frame and aligned with the center axis of the frustum of the cone and extending through the top of the hemispherical cap;
   a covering secured to the frame;
   a plurality of markings selectively applied to the covering using the intersection of the pole and the top of the hemispherical cap of the frame as a point of reference representing Polaris, such that the location of the markings corresponds to the location of a plurality of the stars contained in the twelve zodiac constellations along the ecliptic.

2. The portable planetarium of claim 1 further comprising a plurality of symbols for applying to the covering in order to denote the location of the sun and planets and their satellites at arbitrary times during the year.

3. The portable planetarium of claim 1 wherein the frame comprises ribs running longitudinally from the base of the cone to the top of the hemispherical cap, the ribs substantially converging at the point of intersection between the pole and the top of the hemispherical cap.

4. The portable planetarium of claim 1 wherein the covering comprises an inner surface and an outer surface and wherein the markings are applied to the inner surface of the covering.

5. The portable planetarium of claim 1 wherein the covering comprises a substantially transparent film in order to accommodate outside use of the planetarium to correlate the markings on the covering with actual celestial bodies.

6. The portable planetarium of claim 5 wherein the markings are phosphorescent.

7. The portable planetarium of claim 5 further comprising a plurality of symbols for applying to the covering in order to denote the location of the sun and the planets and their satellites at arbitrary times during the year.

8. A portable planetarium for ascertaining the position of the sun, the moon, planets and their satellites, and the stars throughout the year, comprising:
   a collapsible ribbed frame having a configuration defined by a frustum of a cone with a substantially hemispherical cap attached such that the ribs substantially converge at a point defined by the intersection of the center axis of the cone and the top of the hemisphere and wherein the frustum of the cone provides sufficient extension to depict the full ecliptic and wherein said frustum of the cone and said hemispherical cap have inner dimensions such that a human user may place his head within them in order to substantially simulate the perspective of the sky around the user;
   a pole secured to the frame and aligned with the center axis of the frame such that it extends through the point of convergence of the ribs;
   a substantially transparent film secured to the ribs;
   a plurality of markings applied to the film corresponding to the location of the twelve zodiac constellations along the ecliptic such that the location of the markings are positioned utilizing the point of convergence as the reference point representing Polaris.

9. The planetarium of claim 1, further comprising:
   a plurality of symbols for applying to the film to denote the location of the planets and their satellites at arbitrary times during the year.

10. The planetarium of claim 2 wherein the symbols comprise an adhesive surface and a phosphorescent surface opposing said adhesive surface.

11. The portable planetarium of claim 1 or 8 wherein said frustum effectively extends said hemispherical cap such that the portion of the sky for which celestial bodies may be displayed ranges from plus 90° at the top of the hemispherical cap to minus 60° at the base of the cone in order to accommodate the display of the full ecliptic and certain southern constellations and stars.

* * * * *

UNITED STATES PATENT AND TRADEMARK OFFICE
CERTIFICATE OF CORRECTION

PATENT NO. : 4,271,604
DATED : June 9, 1981
INVENTOR(S) : Luther B. Rowsey, Jr.

It is certified that error appears in the above-identified patent and that said Letters Patent are hereby corrected as shown below:

In the Abstract:

Line 14, delete "frustrum" and insert -- frustum--.
Line 17, delete "frustrum" and insert -- frustum--.

Column 1, line 21, delete "emcompasses" and insert
    --encompasses--.

Column 2, line 15, delete "an an outer" and insert
    --and an outer--.

Column 2, line 61, delete "FIGS." and insert
    --figures--.

Column 2, line 68, delete "astrologicalfigures" and
    insert -- astrological figures--.

Column 3, line 52, delete "be".

Column 4, line 38, delete "Februay" and insert
    --February--.

UNITED STATES PATENT OFFICE
CERTIFICATE OF CORRECTION

Patent No. 4,271,604  Dated June 9, 1981

Inventor(s) Luther B. Rowsey, Jr.

It is certified that error appears in the above-identified patent and that said Letters Patent are hereby corrected as shown below:

Column 4, line 39, delete "July-S-" and insert
--July-Scorpio--.

Column 4, line 41, delete "November-Pices" and insert
--November-Pisces--.

Signed and Sealed this

Fourteenth Day of December 1982

[SEAL]

Attest:

GERALD J. MOSSINGHOFF

Attesting Officer  Commissioner of Patents and Trademarks